United States Patent Office 3,206,387
Patented Sept. 14, 1965

3,206,387
CATALYST REACTIVATION IN PROCESS FOR IMPROVING LUBRICATING OILS AND WAXES
Michael T. Smilski, Sewell, N.J., assignor to Socony Mobil Oil Company, Inc., a corporation of New York
No Drawing. Filed Aug. 9, 1962, Ser. No. 215,772
6 Claims. (Cl. 208—27)

This invention relates to a process for improving quality of lubricating oils and waxes. It is more particularly concerned with reactivating the catalyst in a catalytic hydrogenation process for improving color and other characteristics of mineral lubricating oils and petroleum waxes.

In a copending application, Serial Number 832,980, filed August 11, 1959, there was disclosed a process for improving the color of oils and waxes, that involved contacting with a catalyst comprising molybdena (molybdenum oxide) supported upon alumina of specified pore diameter and in the presence of hydrogen. Such an operation is usually called a "finishing" operation. As is the case with most catalytic processes, the catalyst becomes less active as a continuous run progresses. Eventually the catalyst becomes sufficiently inactive that it must be replaced or regenerated. Particularly when charging oils and waxes of low sulfur content, the length of run before replacement or regeneration is necessary is relatively short. It is highly desired and of great economic advantage to be able to operate over relatively long periods of time before replacing or regenerating that catalyst.

In United States Letters Patent No. 2,914,470, there is disclosd a method for maintaining the activity of a catalyst in a process of hydrorefining petroleum. The patentees propose to maintain a partial pressure of hydrogen sulfide in the reactor, throughout the entire process. In copending application Serial Number 845,650, filed October 12, 1959, now abandoned, of which this application is a continuation-in-part, it was taught that, in decolorizing over a specified molybdena-alumina catalyst, the use of hydrogen sulfide need not be restored to, until the catalyst had lost activity. At that time, it was found that addition of hydrogen sulfide would restore the catalyst to its initial activity for decolorizing.

It has now been found that the on-stream time in finishing lubricating oil or petroleum wax in the presence of hydrogen and of a molybdena-on-alumina catalyst can be increased readily and economically. It has been discovered that, after a molybdena-on-alumina catalyst has lost its activity for finishing lubricating oils and waxes, catalyst activity can be restored by adding with the charge a small amount of hydrogen sulfide or a compound that forms hydrogen sulfide, thereby maintaining a partial pressure of hydrogen sulfide in the reactor. It has been further discovered, however, that the addition of hydrogen sulfide need only be maintained for a relatively short period of time and that it can be discontinued until the catalyst again loses activity, whereupon hydrogen sulfide is again used.

Accordingly, it is a broad object of this invention to increase the on-stream time in finishing lubricating oils and petroleum waxes. Another object is to provide a method for periodically reactivating a molybdena-on-alumina catalyst. A specific object is to provide an improvement in the process of finishing lubricating oils and petroleum waxes in the presence of hydrogen and of molybdena-on-alumina catalyst, wherein the catalyst is reactivated, as it loses catalystic activity, by introducing a partial pressure of hydrogen sulfide into the feed for a relatively short period of time. Other objects and advantages of this invention will become apparent to those skilled in the art from the following detailed description.

In general, the present invention provides, in a process for improving color characteristics of a lubricating oil or of a petroleum wax that comprises contacting a mineral lubricating oil and/or a petroleum wax with a catalyst comprising between about 5 percent and about 20 percent molybdena, by weight, supported upon alumina having an average pore diameter varying between about 110 A. and about 600 A.; in the presence of hydrogen in an amount, expressed as the molar ratio of hydrogen to hydrocarbon, varying between about 2 and about 20; at a pressure varying between about 100 p.s.i.g. and about 3000 p.s.i.g.; at a liquid hourly space velocity varying between about 0.1 and about 15; and at a temperature verying between about 250° F. and about 700° F., the improvement that comprises introducting between about 0.5 percent and about 10 percent, by volume of the hydrogen gas in the reactor, of hydrogen sulfide as the said catalyst loses its activity for improving color characteristics, and for a relatively short period of time.

In order to be effective for decolorizing lubricating oils or waxes, the alumina carrier of the molybdena-on-alumina catalyst must have a pore diameter greater than 110 A. and up to 600 A., preferably greater than 150 A., and up to 250 A. In other words, the catalyst support has a very low surface area. The pore diameter of the alumina can be adjusted by calcining for controlled periods of time, as those skilled in the art will readily appreciate, or by other known means of adjusting alumina surface area. The amount of molybdena ($MoO_3$) that is included in the catalyst can vary between about 5 percent and about 20 percent, by weight. The incorporation of the molybdena can be done by any of the means well known in the art for preparing supported molybdena catalysts.

The process improved by this invention involves a mild hydrogenation. Accordingly, the reaction conditions will be relatively mild. Thus, the temperature will vary between about 250° F. and about 700° F., preferably between about 300° F. and about 650° F. The pressure used will be between about 100 p.s.i.g. and about 3000 p.s.i.g. and preferably between about 200 p.s.i.g. and about 1500 p.s.i.g. The process is carried out in the presence of hydrogen circulated in amounts varying between about 200 s.c.f./bbl. charge and about 10,000 s.c.f./bbl, charge, preferably between about 400 and about 2000 s.c.f./bbl. charge. The liquid hourly space velocity will vary between about 0.1 and about 15, and preferably between about 0.25 and about 10. The particular reaction conditions used, within the aforedescribed ranges, will vary with the charge stock. In general, lubricating oils, other than the heavy lubes, will require relatively mild conditions, in the lower portion of the ranges of temperature, pressure and hydrogen-oil ratio and in the upper portion of the range of liquid hourly space velocity. Waxes, and heavy lubes, on the other hand require more severe conditions within the defined ranges.

The process is applicable to any unfinished lubricating oil fraction or petroleum wax. The lubricating oil fractions contemplated are lube fractions that have been refined by any method, including solvent refining and acid-treating. They may or may not be dewaxed before finishing. In many cases, when the decolorized wax is also desired, it is contemplated to hydrogenate the wax-containing lubricating oil fraction and to dewax subsequently. The oils can have Saybolt Universal viscosities (SUV) ranging from about 55 seconds at 100° F. to about 300 seconds at 210° F. They can come from various types of crude sources.

The waxes that can be treated by the process of this invention are the usual waxes found in petroleum. Of particular interest, however, are the paraffin waxes of various melting points, microcrystalline wax, and petrolatum stocks.

The improvement of this invention is applicable to the aforedescribed process at the time when the catalyst has become deactivated and satisfactory decolorization is no longer being effected. At this time there is created in the reactor a partial pressure of hydrogen sulfide amounting to between about 0.5 percent and about 10 percent of the volume of hydrogen gas, and preferably between about 2 percent and about 5 percent. The most feasible way to do this is to add hydrogen sulfide gas with the hydrogen-containing gas. It can also be achieved by adding suitable amounts of materials which produce hydrogen sulfide in situ, such as carbon disulfide, methyl sulfide, and the like.

It is a feature of this invention that the addition of hydrogen sulfide, or material that produces hydrogen sulfide in situ, need only be continued for a short period of time relative to the total processing time that is achieved. After introducing hydrogen sulfide for a short time, the catalyst is sufficiently re-activated. Then operation can continue with 100% hydrogen gas, until catalyst activity again drops to an unsatisfactory level. Thereupon, another treatment with hydrogen sulfide can be used to regain activity. The cycle of re-activating the catalyst can be carried out several times before the catalyst requires regeneration, dependent on the type of stock being decolorized. The period of time during which hydrogen sulfide is added can vary from a few hours to several days. In general, the period of time during which hydrogen sulfide is added will be between about 2 hours and about 48 hours, although longer periods can be used without harm to the process.

The following examples illustrate the improved process of this invention and demonstrate the advantages thereof. Color of the treated product was measured by spectrophotometric color. The method used is as follows:

SPECTROPHOTOMETRIC COLOR

The color of the lubricating oils and waxes herein is measured as the Spectrophotometric Color. The value is calculated from the transmittance of a sample oil with reference to a reference oil (100 percent transmittance), which is measured at several wave lengths in a spectrophotometer. Any standard spectrophotometer with a tungsten-filament lamp and capable of producing bandwidths of less than 10 millimicrons throughout the visible spectrum can be used.

In operation, the spectrophotometer is prepared according to manufacturer's instructions. Then, a glass cell (with an optical path of 1.000±0.003 centimeter) is filled with the standard reference oil, Liquid Petrolatum, USP XIII, and placed in the instrument. The instrument is adjusted to read 100 percent transmittance with the standard in the light path, at a light wave-length of 430 millimicrons. Thereupon, the test sample, in a glass cell as aforedescribed, is put into the spectrophotometer in place of the cell of standard reference oil. The transmittance is read to the nearest 0.1 percent at 430 millimicrons. Then, transmittance readings are taken at 520, 610, and 700 millimicrons wave-length. The color is computed as: Spectrophotometric Color=$317-[\frac{2}{3}T_{430}+T_{520}+T_{610}+\frac{1}{2}T_{700}]$, wherein T is the percent transmittance at the wave-length indicated by the subscript number. Values are reported to the nearest unit. On the Spectrophotometric Color scale, a value of zero (0) would correspond to a perfectly transparent sample with 100 percent transmittance at all wave-lengths (−1 on ASTM Color Scale). The darker colors will give higher values, up to a high of 317, which corresponds to >8 on the ASTM Color Scale (ASTM Designation D–1500–58T). The test is reproducible within one (1) unit on the Spectrophotometric Scale.

*Example 1*

The charge stock used in the run of this example was an unfinished bright stock having the following characteristics:

| | |
|---|---|
| ° API gravity | 26.6 |
| SUV @ 210° F. _____ sec__ | 142 |
| Viscosity index | 96 |
| Sulfur, wt. percent | 0.21 |
| Pour point _____° F__ | 20 |

This bright stock was continuously charged to a hydrogenation unit in contact with a catalyst comprising 10.7 weight percent molybdena ($MoO_3$) supported upon alumina having a pore diameter of 226 A., in the presence of 100% hydrogen. The run was carried out at a temperature of 525° F., at a reactor pressure of 250 pounds per square inch gauge (p.s.i.g.) and a liquid hourly space velocity of 3, and using a hydrogen circulation rate of 1000 standard cubic feet per barrel of feed (s.c.f./bbl.). The charge stock had a Spectrophotometric Color of 314. In the initial stages of the run the effluent oil had a Spectrophotometric Color of 255. During the run, the color of the finished oil darkened. After 11 days of operation, the color of the finished oil had darkened to an unsatisfactory 268 Spectrophotometric Color.

At this time, 5 volume percent hydrogen sulfide was added to the hydrogen gas feed. The color of the effluent oil returned to 255 Spectrophotometric Color. The color was still at that level during an additional operating period of 5 days, at which time the run was stopped.

*Example 2*

The charge stock during the run of this example was an unfiltered microcrystalline petroleum wax having the following properties:

| | |
|---|---|
| ° API gravity | 34.3 |
| SUV @ 210° F. _____sec__ | 79.2 |
| Melting Pt., ASTM _____ ° F__ | 166 |
| Penetration, ASTM needle @ 77° F. _____ | 23 |
| Color, Spectrophotometric _____ | >317 |

This wax was continuously charged to a reactor in contact with a catalyst comprising 11.0 weight percent molybdena supported upon alumina having a pore diameter of 218 A., in the presence of pure hydrogen. The run was conducted at a temperature of 650° F., and at a pressure of 1500 p.s.i.g. and a liquid hourly space velocity of 0.5. The hydrogen circulation rate was 5000 s.c.f./bbl. During the course of ten days, there were produced 630 bbls. per ton of catalyst of product having a Spectrophotometric Color of about 45. By the end of 12 days, the color had increased to 90 Spectrophotometric Color, and was unsatisfactorily dark. In the usual operation, the unit would be shut down to regenerate the catalyst.

In this run, however, 5 volume percent hydrogen sulfide was added to the hydrogen stream and the run was continued under the same conditions. The color of the product improved to 45 Spectrophotometric Color. The run was continued at these conditions with hydrogen sulfide in the hydrogen gas stream. Then, during the continuance of the run a study of the effect of process variables was made. The pertinent data for the entire run, and the variations made, are set forth in Table I. At the end of 61 days, the catalyst was still active, although it had been subjected to less favorable conditions during the run.

light solvent refined distillate stock (designated hereinafter as Oil B) having the following characteristics:

| | |
|---|---|
| ° API gravity | 30.6 |
| SUV @ 210° F. sec | 43.5 |
| Viscosity index | 102 |
| Pour point ° F | 20 |
| Color, ASTM | 2— |
| Color, Spectrophotometric | 91 |

TABLE I

| Run Portion | A | B | C | D | E | F | G | H | I |
|---|---|---|---|---|---|---|---|---|---|
| Operation conditions: | | | | | | | | | |
| Pressure, p.s.i.g | 1,500 | 1,500 | 250 | 1,500 | 1,500 | 1,500 | 800 | 1,000 | 1,500 |
| Temperature, ° F | 650 | 650 | 650 | 650 | 650 | 650 | 650 | 650 | 650 |
| LHSV, v./v./hr | 0.5 | 0.5 | 0.5 | 0.5 | 0.5 | 0.5 | 0.5 | 0.5 | 0.5 |
| Gas circulation, s.c.f./bbl | 5,000 | 5,000 | 5,000 | 5,000 | 5,000 | 5,000 | 5,000 | 5,000 | 5,000 |
| Gas composition, vol. percent: | | | | | | | | | |
| Hydrogen | 100 | 95 | 95 | 100 | 95 | 98 | 98 | 98 | 98 |
| Hydrogen sulfide | | 5 | 5 | | 5 | 2 | 2 | 2 | 2 |
| Run time, days | 12 | 1 | 3.3 | 1.2 | 9.0 | 19.9 | 4.5 | 7.8 | 2.2 |
| Cumulative | | 13 | 16.3 | 17.5 | 26.5 | 46.4 | 50.9 | 58.7 | 60.9 |
| Product processed, bbl./T | 760 | 63 | 210 | 74 | 567 | 1,256 | 284 | 494 | 137 |
| Cumulative | | 823 | 1,033 | 1,107 | 1,674 | 2,930 | 3,214 | 3,708 | 3,845 |
| Spectrophotometric color | 45 to 90 | 45 | 120 | 45 | 40 | 45 | 60 | 50 | 45 |

From the results of the runs described in the examples, it will be apparent that decolorizing activity of the molybdena-on-alumina catalyst, which has decreased to a low level, can be readily restored by operating with hydrogen sulfide in the hydrogen stream. Particularly in the case of Example 2, it should be noted that the run was not discontinued because of catalyst deactivation. In Table I, run Portion A was the operation without hydrogen sulfide. Portion B is the described run with hydrogen sulfide, showing the activation achieved. It will be noted that pressures much lower than 1000 p.s.i.g. have an adverse effect on color (Portion C and G). This is in accord with statements hereinbefore that waxes require more severe conditions. When conditions of Portion C were restored to 1500 p.s.i.g., color was again satisfactory (Portion D). It will be noted that catalyst activity had been restored and that this run portion was carried out without use of hydrogen sulfide. Thus, the use of hydrogen sulfide need not be continuous. At the time of shutdown, the catalyst was still active (Portion I). Thus, by the present process 3845 bbls. product per ton catalyst were processed, whereas usual shutdown would have been after 760 bbls. (Portion A).

As noted with regard to the run of Example 2, hydrogen sulfide need be used only when the catalyst has lost activity. The following run describes a typical commercial type operation, wherein hydrogen sulfide is used periodically to restore catalyst activity. As is typical in commercial operation that is attuned to current demands, several types of stocks are alternated in the unit.

*Example 3*

Two unfinished lubricating oil stocks were used in this run. One was the bright stock described in Example 1 (designated hereinafter as Oil A) and the other was a Commencing with Oil B, these oils were alternately charged for varying periods of time to a continuous unit, in contact with the molybdena catalyst defined in Example 1. All runs were carried out under 250 p.s.i.g. pressure with a hydrogen circulation rate of 1000 s.c.f./bbl. When Oil B was charged, the temperature was 500° F. and LHSV was 5. When Oil A was charged, the temperature was 525° F. and LHSV was 3. Whenever the catalyst showed loss of activity, as evidenced by color increase to above about 260 for Oil A or above about 26 for Oil B, hydrogen sulfide was charged with the hydrogen for a period of time. Then, the run was continued in the absence of hydrogen sulfide, until the catalyst again lost decolorizing activity. Then, the treatment with hydrogen sulfide was again used. In Table II are set forth the pertinent data of this run.

TABLE II

| Oil charge | Run time, hours | Cumulative Time, days | Charge gas, vol. percent | Spectrophotometric color |
|---|---|---|---|---|
| B | 17 | 0.7 | 100% H | 14 |
| A | 20 | 1.6 | 100% H | 250 |
| B | 139 | 7.4 | 100% H | 25 |
| A | 20 | 8.2 | 100% H | 252-260 |
| B | 29 | 9.4 | 100% H | 30 |
| B | 75 | 12.5 | 100% H | 26 |
| A | 20 | 13.4 | 100% H | 262 |
| B | 101.5 | 17.6 | 100% H | 27 |
| A | 71 | 20.6 | 100% H | 266 |
| A | 14 | 21.2 | 95% H₂+5% H₂S | 246 |
| B | 17 | 21.8 | 95% H₂+5% H₂S | 25 |
| A | 283 | 33.6 | 100% H₂ | 255-285 |
| A | 118 | 38.5 | 95% H₂+5% H₂S | 255 |
| A | 108 | 43.0 | 100% H₂ | 255 |
| B | 71 | 46.0 | 100% H₂ | 25 |
| B | 26 | 47.0 | 95% H₂+5% H₂S | 16 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. In a process for improving color characteristics of a hydrocarbon fraction selected from the group consisting of an unfinished mineral lubricating oil and an unfinished petroleum wax to produce a hydrocarbon fraction effluent having satisfactory color characteristics that comprises contacting in a reactor said hydrocarbon fraction with a catalyst comprising between about 5 percent and about 20 percent molybdena, by weight, supported upon alumina having an average pore diameter varying between about 110 A. and about 600 A.; in the presence of hydrogen circulated at a rate varying between about 200 s.c.f./bbl. and about 10,000 s.c.f./bbl.; at a pressure varying between about 100 p.s.i.g. and about 3000 p.s.i.g.; at a liquid hourly space velocity varying between about 0.1 and about 15; and at a temperature varying between about 250° F. and about 700° F.; the improvement that comprises introducing hydrogen sulfide in an amount of from about 0.5 percent to about 10 percent by volume of the hydrogen gas in the reaction after a hydrocarbon fraction effluent having satisfactory color characteristics has been produced, said introduction of hydrogen sulfide being done for a short period of time and being started when said effluent has attained unsatisfactory color characteristics.

2. In a process for improving color characteristics of a hydrocarbon fraction selected from the group consisting of an unfinished mineral lubricating oil and an unfinished petroleum wax to produce a hydrocarbon fraction effluent having satisfactory color characteristics that comprises contacting in a reactor said hydrocarbon fraction with a catalyst comprising between about 5 percent and about 20 percent molybdena, by weight, supported upon alumina having an average pore diameter varying between about 150 A. and about 250 A.; in the presesnce of hydrogen circulated at a rate varying between about 400 s.c.f./bbl. and about 2000 s.c.f./bbl.; at a pressure varying between about 200 p.s.i.g. and about 1500 p.s.i.g.; at a liquid hourly space velocity varying between about 0.25 and about 10; and at a temperature varying between about 300° F. and about 650° F.; the improvement that comprises introducing hydrogen sulfide in an amount of from about 2 percent to about 5 percent by volume of the hydrogen gas in the reactor after a hydrocarbon fraction effluent having satisfactory color characteristics has been produced, said introduction of hydrogen sulfide being done for a period of time of from about 2 hours to about 48 hours and being started when said effluent has attained unsatisfactory color characteristics.

3. The process defined in claim 2, wherein said hydrocarbon fraction is unfinished bright stock.

4. The process defined in claim 2, wherein said hydrocarbon fraction is unfinished microcrystalline wax.

5. In the process for improving color characteristics of an unfinished bright stock to produce a bright stock effluent having satisfactory color characteristics that comprises contacting in a reactor said unfinished bright stock with a catalyst comprising between about 5 percent and about 20 percent molybdena, by weight, supported upon alumina having an average pore diameter varying between about 150 A. and about 250 A.; in the presence of hydrogen circulated at a rate of about 1000 s.c.f./bbl.; at a pressure of about 250 p.s.i.g.; at a liquid hourly space velocity of about 3; and at a temperature of about 525° F.; the improvement that comprises introducing hydrogen sulfide in an amount of from about 2 percent to about 5 percent by volume of the hydrogen gas in the reactor after a bright stock effluent having satisfactory color characteristics has been produced, said introduction of hydrogen sulfide being done for a period of time of from about 2 hours to about 48 hours and being started when said bright stock effluent has attained unsatisfactory color characteristics.

6. In the process for improving the color characteristics of an unfinished microcrystalline wax to produce a microcrystalline wax effluent having satisfactory color characteristics that comprises contacting in a reactor said unfinished wax with a catalyst comprising between about 5 percent and about 20 percent molybdena, by weight, supported upon alumina having an average pore diameter varying between about 150 A. and about 250 A.; in the presence of hydrogen circulated at a rate of about 5000 s.c.f./bbl.; at a pressure of about 1500 p.s.i.g.; at a liquid hourly space velocity of about 0.5; and at a temperature of about 650° F.; the improvement that comprises introducing hydrogen sulfide in an amount of from about 2 percent to about 5 percent by volume of the hydrogen gas in the reactor after a wax effluent having satisfactory color characteristics has been produced, said introduction of hydrogen sulfide being done for a period of time of from about 2 hours to about 48 and being started when said wax effluent has attained unsatisfactory color characteristics.

References Cited by the Examiner

UNITED STATES PATENTS

| | | | |
|---|---|---|---|
| 2,914,470 | 11/59 | Johnson et al. | 208—264 |
| 2,985,580 | 5/61 | Heinemann | 208—264 |
| 2,985,586 | 5/61 | Willson et al. | 208—264 |

ALPHONSO D. SULLIVAN, *Primary Examiner.*

JOSEPH R. LIBERMAN, *Examiner.*

UNITED STATES PATENT OFFICE
CERTIFICATE OF CORRECTION

Patent No. 3,206,387                                       September 14, 1965

Michael T. Smilski

It is hereby certified that error appears in the above numbered patent requiring correction and that the said Letters Patent should read as corrected below.

Column 1, line 16, after "August 11, 1959," insert -- now abandoned, --; line 40, for "restored" read -- resorted --.

Signed and sealed this 17th day of May 1966.

SEAL)

Attest:

ERNEST W. SWIDER                                         EDWARD J. BRENNER

Attesting Officer                                            Commissioner of Patents